(No Model.)
H. B. PERRY.
PNEUMATIC SHUTTER FOR PHOTOGRAPHIC CAMERAS.
No. 287,858. Patented Nov. 6, 1883.
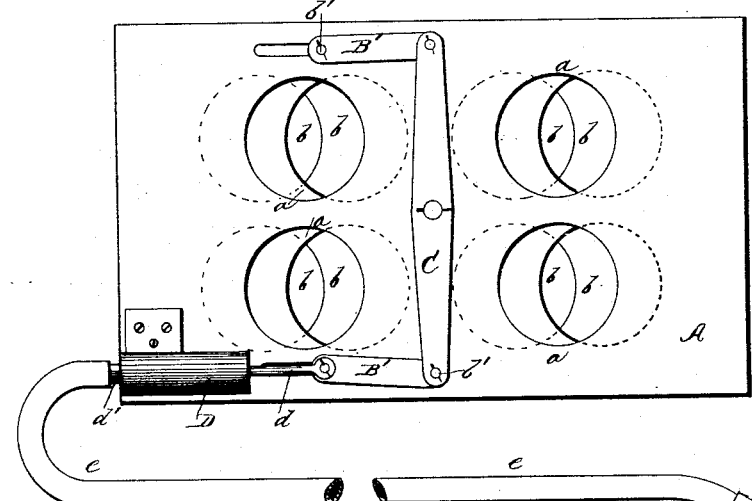
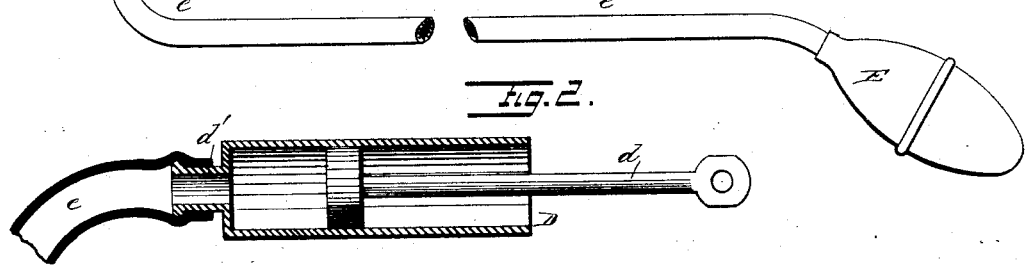
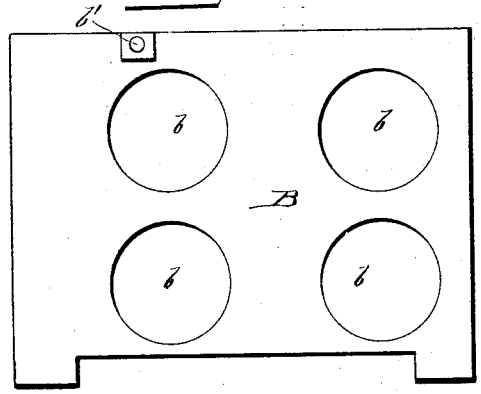 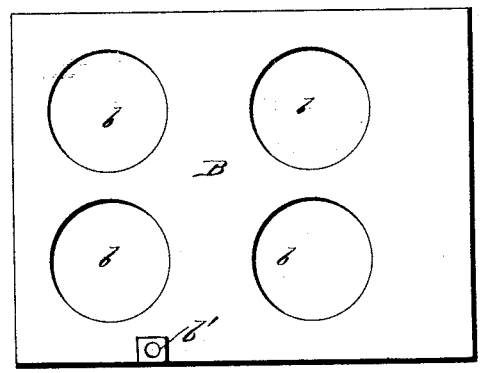
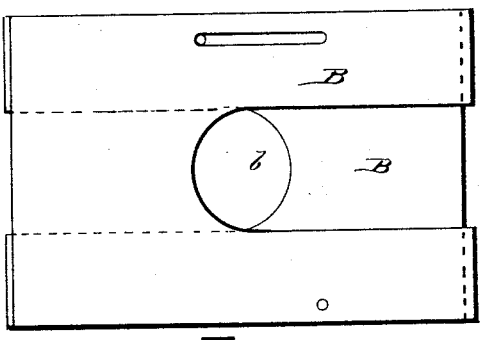
Witnesses:
C. L. Carman
N. C. McArthur
Inventor.
Henry B Perry
H Harrison
Attorney

UNITED STATES PATENT OFFICE.

HENRY B. PERRY, OF CHICAGO, ILLINOIS.

PNEUMATIC SHUTTER FOR PHOTOGRAPHIC CAMERAS.

SPECIFICATION forming part of Letters Patent No. 287,858, dated November 6, 1883.

Application filed February 17, 1883. (No model.)

*To all whom it may concern:*

Be it known that I, HENRY B. PERRY, a citizen of the United States of America, residing at Chicago, in the county of Cook and State of Illinois, have invented certain new and useful Improvements in Camera-Shutter Workers, of which the following is a specification.

This invention relates to pneumatic shutters for photographic cameras; and it consists in the peculiar construction of the slides, and the combination with them of an air-cylinder and piston, substantially as will be hereinafter more fully set forth.

In order to enable others skilled in the art to which my invention relates to make and use the same, I will now proceed to describe its construction and operation, referring to the accompanying drawings, in which—

Figure 1 is a front elevation of the device partly opened. Fig. 2 is an enlarged section of the air-cylinder; and Figs. 3, 4, and 5 are views of different slides arranged to be operated as I shall describe.

A represents a frame formed with any desired number of openings, $a\ a$, adapted to register with the lens-tubes of a photographic camera.

Within the frame are two slides, B B, each provided with opening $b$, corresponding to those in the case or frame, and arranged to slide past each other in opposite directions. Each of these slides is provided with a stud, $b'$, extending through slots $a'$ in the case or frame, and connected by links B' with the opposite ends of a lever, C, pivoted on the case, and one of these studs is also connected to the piston-rod $d$ of an air-cylinder, D. This cylinder is formed with a nipple, $d'$, on one end, and provided with the usual rubber tube, $e$, and air-bulb E, as represented in the drawings.

In operation, the shutters being normally closed, the bulb is pressed, the air within it passing into the cylinder and driving the piston back, and, by means of the lever C and links B', moving the slides or shutters in opposite directions till their openings and those in the case coincide and expose the lens of the camera. The removal of the pressure from the bulb draws the air into it again and operates the slides in a reverse direction.

It will be seen that by the peculiar arrangement described the openings in the slide expose the lens to the light at the center first and close it at this point last, which will give the best results in a picture, while by the connection of the two slides by the lever and its operation by piston-rod the motion is very quick and positive in both directions, and the two slides moving in opposite directions reduces the required length of stroke, and consequently makes the exposure of different parts of a picture more nearly equal.

It is obvious that any number of openings may be used in a single slide, as may desired, and they may in some cases be open-ended slots, as shown by Fig. 5.

Having thus fully described my invention, what I claim as new, and desire to secure by Letters Patent, is—

The combination of the frame A, slides B B, having stud $b'$, links B', and lever C, with the cylinder D, having piston $d$, connected to the lever, and the air-bulb E and its tube $e$, all constructed and arranged to operate substantially as and for the purpose set forth.

In testimony whereof I affix my signature in presence of two witnesses.

HENRY B. PERRY.

Witnesses:
J. E. STEPHENSON,
FRANK JOHNSON.